United States Patent [19]

Bullock

[11] Patent Number: 4,874,509

[45] Date of Patent: Oct. 17, 1989

[54] OXIDATION SATURATION DEVICE

[76] Inventor: Donald Bullock, 31 Logging Hill Rd., Concord, N.H. 03301

[21] Appl. No.: 42,419

[22] Filed: Apr. 24, 1987

[51] Int. Cl.$^4$ .......................... B01F 3/04; C02C 5/06
[52] U.S. Cl. ..................... 210/169; 210/222; 261/DIG. 75; 261/DIG. 80; 261/29; 204/149
[58] Field of Search ............ 210/150, 169, 205, 221.2, 210/758, 765, 243, 222, 220; 261/DIG. 75, DIG. 80, 29, 36.1; 204/149

[56] References Cited

U.S. PATENT DOCUMENTS

| | | | |
|---|---|---|---|
| 3,662,890 | 5/1972 | Grimshaw | 210/220 |
| 3,766,050 | 10/1973 | Pados | 204/149 |
| 3,826,742 | 7/1974 | Kirk et al. | 261/DIG. 75 |
| 3,925,522 | 12/1975 | Schreiber | 261/121.1 |
| 4,072,612 | 2/1978 | Daniel | 210/169 |
| 4,146,472 | 3/1979 | Treyssac | 210/137 |
| 4,211,733 | 7/1980 | Chang | 210/220 |
| 4,265,754 | 5/1981 | Menold | 210/222 |
| 4,525,272 | 6/1985 | Henson | 210/243 |
| 4,533,123 | 8/1985 | O'Leary | 261/DIG. 75 |
| 4,639,340 | 1/1987 | Garrett | 261/DIG. 75 |
| 4,664,680 | 5/1987 | Weber | 261/19 |

Primary Examiner—Peter Hruskoci
Assistant Examiner—Coreen Y. Lee

[57] ABSTRACT

An apparatus and method for dissolving a gas in a liquid comprising a long tube or conduit having an inlet connected to a source of gas and liquid mixed together under pressure and an outlet connected to a back pressure valve that maintains the pressure in the tube above the partial gas pressure necessary to ensure that the liquid is saturated with the dissolved gas. The invention is especially useful for purifying, sterilizing, and clarifying water in a pool, tank or pond with air as the dissolved gas. A primary purpose of the invention is to enhance oxidation.

1 Claim, 3 Drawing Sheets

OXIDATION SATURATION DEVICE

BACKGROUND OF THE INVENTION

1. Field of the Invention

This invention relates generally to a device for dissolving a gas in a liquid and, in particular, or saturating a gas such as oxygen, air, or chlorine in a liquid such as water for purposes of purification, sterilization, clarification, and/or oxidation.

2. Description of the Prior Art

Devices for dissolving a gas in a liquid, especially in water treatment, are well known. The solubility of a substance is the maximum amount of that substance that can be dissolved in a given amount of solvent at a specified temperature and pressure. In the case of a gas as the solute and a liquid as the solvent, in accordance with Henry's Law, the weight of gas which dissolves in a liquid at a given temperature is proportional to the partial pressure of the gas over the solution. The ultimate purpose for dissolving a gas such as oxygen in water is to remove impurities in the water through the chemical reactions resulting from the interaction of the oxygen and impurities residing in the water. For example, dissolved oxygen causes decomposition of organic wastes in water by increasing biological activity. Even though the chemistry of water treatment for waste removal and purification using gaseous solutes is well known, the devices shown in the prior art do not achieve the efficiency required to maximize saturation of the gas in water. U.S. Pat. No. 4,215,081, issued to Brooks on July 29, 1980, discloses a liquid aerator that uses a vertical cylinder having tangential inlets that creates a swirling action between the gas and the water to induce dissolution. Other devices such as shown in U.S. Pat. No. 3,880,965 issued to Dudis et al on Apr. 29, 1975 and U.S. Pat. No. 3,452,966 issued to Smolski on July 1, 1969 use diffusers and bafflers to enhance interaction of air bubbles with the water.

The present invention increases the efficiency of the dissolution process using a non-complex apparatus by increasing the partial pressure of the gas and the time of interaction while the gas is being mixed in the liquid thereby operationally enhancing the most important factors for maximum saturation.

SUMMARY OF THE INVENTION

The present invention is an apparatus for dissolving a gas in a liquid to increase the amount of gas by weight in the liquid in order to enhance a desired chemical reaction in the liquid. In particular, an apparatus is disclosed for saturating air (especially oxygen) in water in order to remove organic and inorganic impurities.

In its least complex form, the invention is comprised of a relatively long water transport conduit or tube, preferrably from 25 feet to 200 feet in length, a back pressure valve connected to the outlet end of the conduit, an inlet source of air under pressure that is introduced at the inlet end of the conduit, and an inlet source of water (to be oxygenated) under pressure that is also introduced at the inlet end of the conduit. The velocity of the air-water mixture in the transport conduit is determined in conjunction with the predetermined pressure to be maintained in the transport conduit to establish a desired time period that the mixture will interact under pressure for enhancing dissolution at a given temperature.

The device is especially suited for use with a conventional swimming pool filtration system. High pressure water is diverted from the filter pump outlet line, through a check valve, into the long water transport conduit which also serves as the return line to the pool. There is no requirement to use a check valve, and its use is optional to control flows and pressures. Air under pressure from air pump or eductor is introduced also at the inlet end of the water transport conduit where it begins mixing with the water. The water and air mixture are fed under pressure through the long conduit back to the swimming pool. A back pressure valve near the conduit outlet end maintains a desired pressure in the long conduit causing the air and especially the oxygen therein) to dissolve into the water. Because of the extended length of the conduit, the time period before the air-water mixture returns to the pool is greatly extended ensuring maximum saturation without interfering with the normal operation of the pool filtration system. The transport conduit may be a hose that can be coiled to fit efficiently in the pool area.

In order to further enhance the effectiveness of the device, the gas and water mixture in the tube under pressure can be subjected to an alternating electrical or magnetic field which aids the oxidation of foreign materials in the water.

The conduit outlet is positioned at the greatest depth of the pool and the outflow slowed for more efficient purification of the pool. This is believed to slow or inhibit the saturated oxygen in the exiting mixture from going back out of solution while more thoroughly blending with the water in the pool.

The device is suitable for use in purifying, sterilizing, oxidizing, and clarifing water in pools, fish tanks, tubs, ponds, and natural streams and rivers. It can be employed for enhancement of gas oxidation of chlorine, ozone, hydrogen peroxide, iodine, other halogens, and other oxidizing gases, and for the enhancement of aeration for biochemical and chemical oxygen demand, aerobic decomposition and aquaculture. Other uses include well and tank cleaning, corrosion control, removal of carbon dioxide, hydrogen sulfide, radon and other unwanted gases, manganese, and oxygenating of irrigation water.

It is an object of the invention to provide a device for dissolving a gas in a liquid.

It is another object of this invention to provide a device that increases the efficiency of operation in saturating a liquid with a gas in solution.

Another object of this invention is to provide a device for dissolving a gas in a liquid that is non-complex in structure or operation.

And yet another object of this invention is to provide a device that subjects a gas and liquid to increased pressure in an elongated tube or conduit in order to increase the amount of gas by weight that becomes dissolved in the liquid at a given temperature.

Another object of the invention is to provide a device that can be employed to purify, sterilize, and clarify water in a pool, tank, tub, or other body of water.

In accordance with these and other objects which will be apparent hereinafter, the present invention will be described with particular reference to the accompanying drawings.

PREFERRED EMBODIMENT OF THE INVENTION

Figure 1:
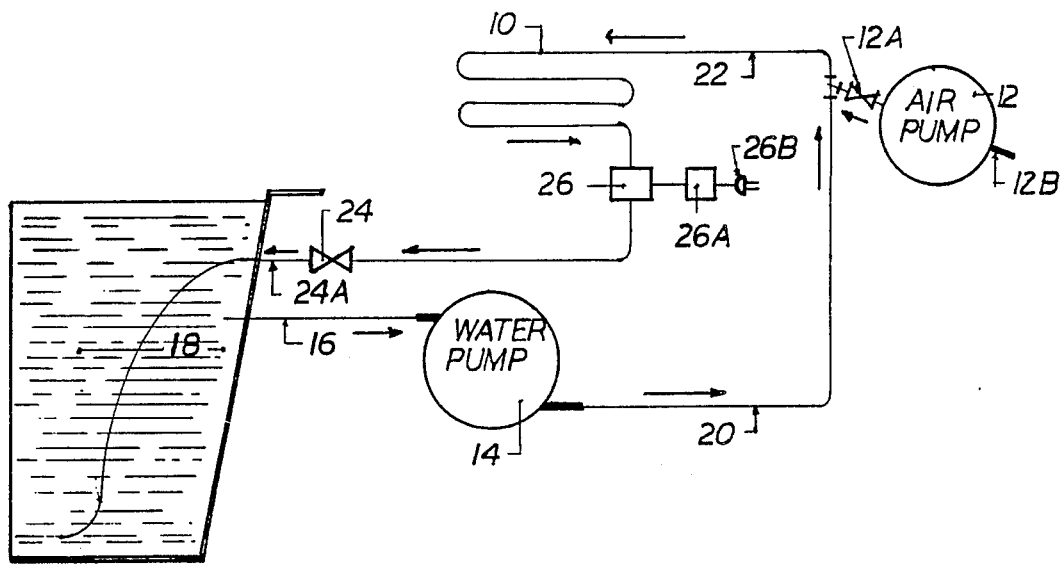
FIG. 1 shows a schematic diagram of the present invention.

Referring now to the drawings, and in particular FIG. 1, the instant invention is shown generally at 10 comprised of an air pump or eductor 12 which is connected through a one-way valve 12a to a liquid reservoir 18 by pipe 20, water pump 14 and pipe 16. Tube 22 is a long (25 to 200 feet) transfer conduit beginning at the connection of air pump 12 and water supply pipe 20 where the air (supplied by air pump 12 under pressure) and water (supplied by water pump 14 under pressure) are initially mixed. Tube 22 transports the mixture of gas and liquid under pressure to a back pressure valve 24 connected at its outlet. The saturated mixture then passes to the end use reservoir 18 through pipe 24a.

Because of the extended length of tube 22, the gas and liquid mixture are subjected to pressure that exceeds that partial pressure of the gas therein for a considerable length of time, thus ensuring that the gas is dissolved thoroughly in the liquid.

As an enhancement to the purification effects produced by the saturation of the liquid by the gas, a source of electro-magnetic energy may be utilized under circumstances where certain impurities are present in the liquid, the impurities having electro-chemical properties that inhibit oxidation. Thus the invention may include an electrical power source 26a connected to field generator 26 to create an alternating electrical or magnetic field within tube 22 that acts on the gas-liquid mixture contained therein. Not only does the field break down protective barriers around certain kinds of polarized impurities, it is believed that the field prevents the oxidizing ions from being trapped by charged molecules such as polarized water molecules.

Figure 2:
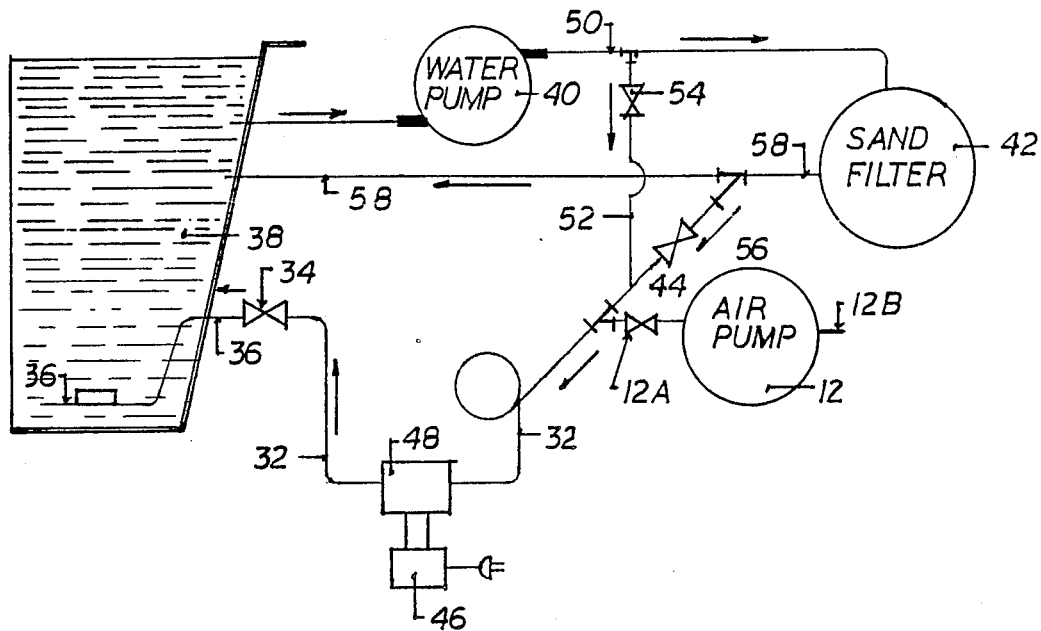
FIG. 2 shows a schematic diagram of the present invention used with a swimming pool.
Figure 3:
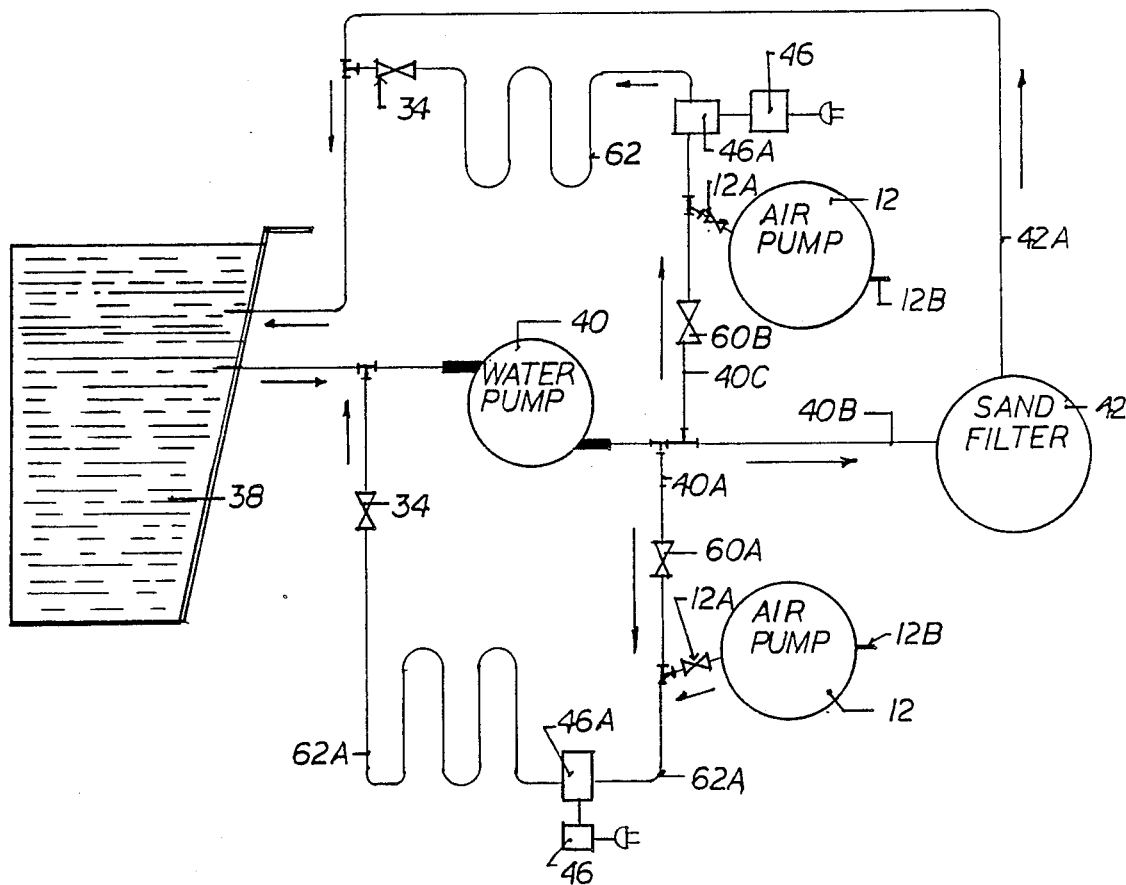
FIG. 3 shows a schematic diagram of an alternate embodiment of the present invention.

FIGS. 2 and 3 show practical applications of the present invention as used for the purification, sterilization, oxidation, and clarification of water in a swimming pool. In these applications, the objective is to greatly reduce or eliminate the use of conventional purifying agents such as chlorine. The invention as shown is used in conjunction with a standard pool circulating pump and filter system.

In FIG. 2, the invention is shown comprised of air pump 12 that has a water source from the outlet of sand filter 42 by pipe 44 and valve 56. Ambient air is provided through pipe 12a. An optional hookup could include an additional water source from pool pump 40 and pipe 50 through pipe 52 and one way check valve 54. The outlet of air pump 12 is a long tube 32 (25 to 200 feet in length) having a back pressure valve 34 that maintains a predetermined pressure (preferably above 10–20 p.s.i.) in tube 32 at all times. The pressure value selected should exceed the partial pressure of the gases to be dissolved at the anticipated operating temperature of the water. The outlet pipe 36 is connected into pool 38 and has the outflow end distributor 36a placed preferably in the deepest location in the pool for best results. The system may also include an alternating electrical or magnetic field provided by field generator 48 and power source 46. The air pump or eductor 12 may be one known under the trademark AIR-VAC model numbers LQT 042, 110, or 190. Note particularly that the water and air mixture under pressure must traverse the entire length of tube 32 before the mixture enters the pool greatly increasing the mixing time period.

It is significant to note that the liquid at high pressure in the conduit does not have to be saturated. If this liquid is, for example, 30% saturated at 50 p.s.i., then when the liquid is released near the bottom of a ten foot pool and a pressure of less than 5 p.s.i., the liquid would then be supersaturated.

FIG. 3 shows a different employment of the invention with a swimming pool that again utilizes the pool pump 40 and a sand filtration element 42. In this arrangement, two air pumps 12 are used with two long tubes 62 and 62a, each tube being 25 to 200 feet in length. Each air pump 12 supplies air under pressure through one-way valves 12a to the water pumped from the outlet side of pool pump 40 through pipes 40a and 40c and valves 60a and 60b. Each air pump has an ambient air inlet 12b. Long tube 62 transports the dissolved air and water mixture under pressure through back pressure valve 34 to the return line 42a from the sand filter 42 to the pool 38. The water and air mixture in tube 62a is also maintained at a predetermined pressure to achieve dissolution and saturation while taking advantage of the pressure differential across pool pump 40 through valve 34. As described above, electrical or magnetic fields can be applied to the air-water mixture under pressure in transport tubes 62 and 62a by field generators 46a connected to power sources 46.

The system can be used in many different environments as has been discussed above and can accommodate use with different liquids as the solvent and different gases (such as pure oxygen and chlorine) as the solute.

While there have been described above the principles of this invention in connection with specific apparatus, it is to be clearly understood that this description is made only by way of example and not as a limitation to the scope of the invention.

What is claimed is;

1. An apparatus for dissolving air in water circulated in a swimming pool, said swimming pool having a water filter and a circulating pump, said apparatus comprising:

a pool water circulating pipe connecting the pool pump, the filter and an inlet and outlet to the pool;

means for supplying air under pressure into water circulating in said pool water circulating pipe; said circulating pipe including a substantially long tube connected downstream of said means for supplying and for transporting a mixture of air and pool water, said tube having a length of at least about 25 feet to ensure optimum dissolution and saturation of the air into the water;

a means for generating an alternating electrical or magnetic field in said mixture circulated in said pool water circulating pipe; and a back pressure valve means for maintaining a predetermined air-water pressure in said tube to achieve dissolution and saturation of the air into the water in said tube, said circulating pipe including an outflow end distributor means located at the bottom of said pool for introducing a supersaturated air-water mixture into said pool.

* * * * *